Patented June 30, 1931

1,812,347

UNITED STATES PATENT OFFICE

WALTER A. KUHNERT, OF LOS ANGELES, CALIFORNIA

METHOD OF PURIFYING BORAX

No Drawing.   Application filed February 11, 1929.  Serial No. 339,277.

This invention relates to the purification of borax and particularly to the removal from crude or impure borax of small amounts of water soluble silica. Many of the impurities ordinarily found in impure borax, such as the crude borax recovered, by various methods of treatment, from the natural borax bearing brines of Owens Lake, California, may be removed from the borax by simple solution and re-crystallization, owing to the difference in solubility of said impurities and of the borax. It has been found, however, that water soluble silica is frequently associated with crude borax, and is a particularly objectionable impurity for the reason that it goes into solution and reprecipitates in substantially the same proportion as does the borax itself. It is also highly important to remove this water soluble silica from the borax, for if it is present to a considerable extent in the final product it gives a slight turbidity to aqueous solutions thereof. This turbidity, while perfectly harmless, renders the product less acceptable to the general public, and for this reason it is very advantageous to remove the major portion of this water soluble silica from the borax.

I have found that if crude or impure borax containing water soluble silica is subjected, in the presence of water, to the action of a water soluble aluminum bearing substance, the borax may be brought into solution, while an insoluble substance is formed which contains the major portion of the silica content of the impure borax, and the method of my present invention is based upon the use of this treatment with an aluminum bearing substance in the presence of water as a method of separating the silica from the borax.

I will now describe the general method of procedure according to this invention, as applied to a crude or impure borax containing water soluble silica (say from 1 to 2% $SiO_2$), together with other impurities, such as for example, small amounts of carbonates, chlorides, or sulphates of sodium or potassium. Such crude borax may, for example, be obtained by any suitable or well known method from natural borax bearing brines, such as the brine from Owens Lake, California. It will be understood, however, that the invention is not limited to the treatment of borax obtained from such brines but may be applied whenever it is desired to separate water soluble silica from an impure borax derived from any source whatever. According to the preferred method of carrying out my invention, the requisite amount of soluble aluminum bearing substance is dissolved in water at suitable temperature, and the crude borax is then dissolved in this solution, at a temperature materially above atmospheric temperature and sufficiently high to afford the desired borax concentration in the resulting solution. The borax goes into solution, while an insoluble precipitate or substance is formed, containing the major portion of the silica and also substantially all of the aluminum. After a suitable short period, sufficient to permit the desired borax concentration to be reached and the formation of the insoluble silica-containing precipitate to be completed, this insoluble residue or precipitate is removed from the solution, as for example by filtration or in any other suitable manner. The filtrate, or the solution otherwise freed from solid material, may then be cooled to cause re-crystallization of borax, which, after separation in any suitable manner, as by centrifuging or filtering, and drying, is found to be substantially free from silica or to contain such a small amount of silica that its presence is entirely unobjectionable. The re-crystallized borax, furthermore, is substantially free from alumina or other aluminum compounds.

Instead of first dissolving the aluminum bearing substance in water and then dissolving the borax therein, the process of my invention may also be carried out, with substantially the same results, by first dissolving the crude or impure borax in water, at a suitable temperature above atmospheric temperature, and then adding to this crude borax solution the desired amount of aluminum bearing substance to cause precipitation of an insoluble material containing the major portion of the silica. The procedure from this point may be substantially as above described. In carrying out the process in this way, the proportion of aluminum bearing substance added is subject to substantially the same conditions as mentioned above, and the temperature of solution should, as before, be sufficient to provide the desired borax concentration.

Any suitable water soluble aluminum bearing substance may be employed in the process. For example, I may use any suitable soluble aluminum salt, such as sodium aluminate or aluminum sulphate. As a matter of fact the crude borax solution is in itself slightly alkaline, and I have found that if a compound of aluminum with an acid radical, such as aluminum sulphate or aluminum chloride, is employed, the formation of a precipitate containing the major portion of the silica will result, in substantially the same manner as though sodium aluminate were used as a reagent.

The proportion of aluminum bearing substance may be varied within certain limits, according to the proportion of silica to be removed, but it is found that in general the use of a larger proportion of aluminum bearing substance as compared to the silica in the crude borax will give a lower silica content in the re-crystallized borax but a higher aluminum content therein, and the proportion to be used in any case should be selected so as to give the most advantageous relation of silica content and aluminum content in the purified product.

As an example of the application of my invention to the purification of one particular sample of borax, the following results are given: 100 grams of crude undried borax containing 1.18 grams of silica, (1.55% $SiO_2$ on a dry basis) were used. Aluminum sulphate was used as the aluminum bearing substance, and 0.4 gram of this material was dissolved in 200 grams of hot water. This dilute solution was heated to boiling and the above amount of impure borax added thereto and agitated for three minutes at a temperature of about 70° C. All of the borax was dissolved within this time, leaving an insoluble residue in suspension. This insoluble residue was removed by filtering the hot solution, and such residue was found to consists principally of silica and alumina, showing on analysis 72.48% $SiO_2$ and 8.69% $Al_2O_3$. The filtrate from the above procedure was cooled to about 20 to 25° C., with agitation, to effect re-crystallization of the borax. The borax crystals were then separated by filtration, and the refined product was found to contain 0.41% $SiO_2$ and 0.006% $Al_2O_3$ on the dry basis. It may be seen, therefore, that the removal of silica from the borax by the above described procedure was substantially complete, and that only a mere trace of the aluminum used in the process was present in the final product.

That the above removal of silica from the borax was due to the presence of the aluminum bearing substance, is evidenced by the fact that simple re-solution of the borax under parallel conditions but in the absence of such aluminum bearing substance, followed by re-crystallization thereof, causes practically no change in the silica content of the borax. For example, 100 grams of crude undried borax containing 0.99% silica, were dissolved in 200 grams of water at about 70° C., and the solution filtered and then cooled. The resulting re-crystallized borax, after separation of the mother liquor and drying, contained 1.027% silica, or approximately the same as in the crude borax.

The effect of adding varying proportions of aluminum bearing substance is illustrated by the following tabulated results of a series of tests in which varying amounts of aluminum sulphate were used. In each case the aluminum sulphate was first dissolved in water. The crude borax was then dissolved therein in sufficient amount to give a 25% borax solution, and the mixture was agitated for three minutes at a temperature of about 70° C. The crude borax used in each of these tests contained 1.55% $SiO_2$. For the sake of comparison, the above described results obtained by simple solution and re-crystallization are also included in this table.

| Test No. | Silica content of crude borax (gms. $SiO_2$) | Weight of aluminum contained in aluminum bearing substance (gms. Al) | Re-crystallized borax | |
|---|---|---|---|---|
| | | | Per cent $SiO_2$ | Per cent $Al_2O_3$ |
| 1 | 1.18 | 0.253 | 0.01 | 0.072 |
| 2 | 1.18 | 0.127 | 0.02 | 0.02 |
| 3 | 1.18 | 0.063 | 0.041 | 0.006 |
| 4 | 1.18 | 0.032 | 0.634 | 0.005 |
| 5 | 0.99 | None | 1.027 | None |

It will be seen from the above that in both tests No. 2 and No. 3 a highly satisfactory removal of silica is obtained, without introducing an excessive amount of alumina in the final product, although the use of a lower percentage of aluminum compound in test No. 3 gave a somewhat poorer removal of silica than in test No. 2, but a much lower proportion of alumina in the product.

On the basis of the above results it may be said that I prefer in general to use sufficient aluminum bearing substance to provide a proportion by weight of from 4 to 12 parts of aluminum for each 100 parts of silica contained in the crude borax to be treated. It will be understood, however, that my invention is not restricted to the use of such proportions of aluminum bearing substance, but covers the use of any suitable proportion of such substance.

I claim:

1. The method of separating water soluble silica from borax which comprises subjecting impure borax containing water soluble silica, in the presence of water, to the action of a water soluble aluminum bearing substance so as to obtain a solution containing borax and an insoluble precipitate containing silica, and separating said solution from said precipitate.

2. The method of separating water soluble silica from borax which comprises subjecting impure borax containing water soluble silica, in the presence of water at a temperature materially above atmospheric temperature, to the action of a water soluble aluminum bearing substance, to obtain a solution containing borax and a precipitate containing silica, separating said precipitate from said solution, and then cooling said solution to cause re-crystallization of borax therefrom.

3. The method of separating water soluble silica from borax which comprises subjecting impure borax containing water soluble silica, to the combined action of water at a temperature materially above atmospheric temperature and of a water soluble aluminum bearing substance containing from 4 to 12 parts of aluminum by weight for each 100 parts of silica contained in the impure borax, continuing such treatment for a sufficient time to dissolve the borax and form a preciptate containing silica, and separating said precipitate from the borax solution.

In testimony whereof I have hereunto subscribed my name this 4th day of February, 1929.

WALTER A. KUHNERT.